United States Patent [19]

Noshay et al.

[11] Patent Number: 4,482,687

[45] Date of Patent: Nov. 13, 1984

[54] PREPARATION OF LOW-DENSITY ETHYLENE COPOLYMERS IN FLUID BED REACTOR

[75] Inventors: Allen Noshay, East Brunswick; Frederick J. Karol, Belle Mead, both of N.J.; Robert J. Jorgensen, Dunbar, W. Va.

[73] Assignee: Union Carbide Corporation, Danbury, Conn.

[21] Appl. No.: 506,772

[22] Filed: Jun. 24, 1983

Related U.S. Application Data

[63] Continuation-in-part of Ser. No. 85,313, Oct. 26, 1979, abandoned, which is a continuation-in-part of Ser. No. 962,112, Nov. 20, 1978, abandoned.

[51] Int. Cl.$^3$ .......................... C08F 2/34; C08F 10/02
[52] U.S. Cl. .................. 526/125; 502/126; 502/127; 502/134; 526/348.6; 526/901; 526/904
[58] Field of Search ................. 526/88, 125

[56] References Cited

U.S. PATENT DOCUMENTS

| | | | |
|---|---|---|---|
| 3,254,070 | 5/1966 | Roelen | 526/901 |
| 3,298,792 | 1/1967 | Drusio | 526/901 |
| 3,645,992 | 2/1972 | Elston | 526/169.2 |
| 4,048,412 | 9/1977 | Caumartin et al. | 526/901 |
| 4,105,847 | 8/1978 | Ito et al. | 526/125 |
| 4,107,415 | 8/1978 | Giannini et al. | 526/125 |
| 4,302,565 | 11/1981 | Goeke et al. | 526/88 |
| 4,302,566 | 11/1981 | Karol et al. | 526/125 |

FOREIGN PATENT DOCUMENTS

| | | | |
|---|---|---|---|
| 2135884 | 1/1972 | Fed. Rep. of Germany | 526/121 |
| 1310547 | 3/1973 | United Kingdom | 526/125 |

*Primary Examiner*—Edward J. Smith
*Attorney, Agent, or Firm*—John S. Piscitello

[57] ABSTRACT

Ethylene copolymers having a density of about 0.91 to 0.94 and a melt flow ratio of about $\geq 26$ to $\leq 40$ are readily produced in a low pressure gas phase process at a productivity of $\geq 500{,}000$ pounds of polymer per pound of Ti with a catalyst formed from selected organo aluminum compounds and a composition prepared by copulverizing magnesium dihalide with a complex obtained by contacting a titanium compound of the structure $Ti(OR)_a X_b$ with an ether, ester, ketone or amine, wherein R is a $C_1$ to $C_{14}$ aliphatic or aromatic hydrocarbon radical, or COR' where R' is a $C_1$ to $C_{14}$ aliphatic or aromatic hydrocarbon radical, X is Cl, Br, I or mixtures thereof, a is 0 or 1, b is 2 to 4 inclusive and a+b=3 or 4.

14 Claims, 2 Drawing Figures

EFFECT OF BUTENE/ETHYLENE RATIO ON POLYMER DENSITY FOR DIFFERENT CATALYST FAMILIES

PREPARATION OF LOW-DENSITY ETHYLENE COPOLYMERS IN FLUID BED REACTOR

CROSS REFERENCES TO RELATED PATENT APPLICATIONS

This application is a continuation-in-part of patent application Ser. No. 085,313, filed Oct. 26, 1979, which is a continuation-in-part of patent application Ser. No. 962,112, filed Nov. 20, 1978, both now abandoned.

BACKGROUND OF THE INVENTION

1. Field of the Invention

The invention relates to the catalytic copolymerization of ethylene with high activity Mg and Ti containing complex catalysts in a low pressure gas phase process to produce polymers having a density of about 0.91 to 0.94 and a melt flow ratio of about $\geq 26$ to $\leq 40$.

2. Description of the Prior Art

To be commercially useful in a gas phase process, such as the fluid bed processes of U.S. Pat. Nos. 3,709,853; 4,003,712 and 4,011,382; Canadian Pat. No. 991,798 and Belgian Pat. No. 839,380, the catalyst employed must be a high activity catalyst, that is, it must have a level of productivity of $\geq 50,000$ and preferably, $\geq 100,000$ pounds of polymer per pound of primary metal in the catalyst. This is so because such gas phase processes usually do not employ any catalyst residue removing procedures. Thus, the catalyst residue in the polymer must be so small that it can be left in the polymer without causing any undue problems to either the resin manufacturer, or to a party fabricating articles from the resin, or to an ultimate user of such fabricated articles. Where a high activity catalyst is successfully used in such fluid bed processes, the heavy metal content of the resin is of the order of $\leq 20$ parts per million (ppm) of primary metal at a productivity level of $\geq 50,000$. Low catalyst residue contents are also important where the catalyst is made with chlorine containing materials such as the titanium, magnesium and/or aluminum chlorides used in some so-called Ziegler or Ziegler-Natta type catalysts. High residual chlorine values in a molding resin will cause pitting and corrosion on the metal surfaces of the molding devices. Molding resins having Cl residues of the order of $\geq 200$ ppm are not commercially useful.

British Pat. No. 1,310,547, published in March 1973, describes the preparation of high density ($>0.96$ g/cc) ethylene homopolymers or copolymers with a supported catalyst. This catalyst is a reaction product of a product prepared by grinding together (preferably in a ball mill) either (i) a magnesium halide and a titanium addition compound, or (ii) a polyvalent titanium compound, an electron donor compound and an organometallic compound or hydride of a Group I to III metal, such as aluminum. The examples of this patent describe the preparation of the homopolymers and copolymers in a slurry process.

U.S. Pat. No. 3,888,835, which issued in June 1975, describes the homopolymerization or copolymerization of ethylene in a slurry process at high temperatures in the presence of a catalyst consisting of (A) a co-comminuted (ball-milled) composition of a titanium halide, an aluminum halide-ether complex and a magnesium halide, and (B) an organoaluminum compound. The polymerization activity of this catalyst is described as very high. Another advantage described in this patent, of using such catalyst, is that the aluminum halide-ether complex used in the catalyst preparation is soluble in hydrocarbon solvents and is removed from the polymer product by filtration.

U.S. Pat. No. 3,991,260, which issued in November 1976, describes the homopolymerization or copolymerization of ethylene in the presence of a catalyst prepared by copulverizing (in a ball mill) a magnesium dihalide, particular aluminum compounds, and vanadium or titanium compounds such as titanium dichloride or titanium trichloride, and wherein the Mg/Al molar ratio in the catalyst ranges from 1:0.01 to 1:1. The polymerization reaction is conducted in a slurry process at high temperatures. The catalyst is described as having high activity.

Thus, these patents which disclose the use of particular ball-milled Mg—Ti containing catalysts, disclose the use of such catalysts, primarily, in a slurry process and not a gas phase process operating under a pressure of $<1000$ psi.

U.S. patent application Ser. No. 892,325, filed Mar. 21, 1978, now abandoned, and refiled as Ser. No. 014,414 on Feb. 27, 1979 in the names of F. J. Karol et al., and entitled Preparation of Ethylene Copolymers In Fluid Bed Reactor, now U.S. Patent 4,302,566, and assigned to the same assignee as is the present patent application, discloses that ethylene copolymers, having a density of 0.91 to 0.96, a melt flow ratio of $\geq 22$ to $\leq 32$, and a relatively low residual catalyst content can be produced in granular form, at relatively high productivities if ethylene is copolymerized with one or more $C_3$ to $C_8$ alpha olefins in a gas phase process with a specific high activity Mg—Ti containing complex catalyst which is blended with an inert carrier material.

U.S. patent application Ser. No. 892,322, filed Mar. 21, 1978, now abandoned, and refiled as Ser. No. 012,720 on Feb. 16, 1979 in the names of G. L. Goeke et al, and entitled Impregnated Polymerization Catalyst, Process For Preparing, and Use For Ethylene Polymerization, now U.S. Patent 4,302,565, and assigned to the same assignee as is the present patent application, discloses that ethylene copolymers having a density range of 0.91 to 0.94, a relatively low residual catalyst content and a relatively high bulk density can be produced at relatively high productivities in a gas phase process if the ethylene is copolymerized with one or more $C_3$ to $C_8$ alpha olefins in the presence of a high activity Mg—Ti containing complex catalyst impregnated in a porous inert carrier material.

However, the catalyst preparation procedures disclosed in U.S. Patents 4,302,566 and 4,302,565 are relatively complex and the precursor compositions of Mg, Ti and an electron donor are formed in such procedures by crystallization or by precipitation of the precursor compositions. Additionally, the manner of activating the catalysts of U.S. Patents 4,302,566 and 4,302,565 is critical in order to obtain an active material. This activation process is conducted by one of two procedures. In the first procedure, the precursor composition is completely activated outside of the reactor. In the second activation procedure, the precursor composition is partially activated outside the reactor and the partially activated precursor composition is fed to the polymerization reactor where the activation is completed with additional activator compound. Further, the polymers produced with the catalysts of U.S. Patents 4,302,566 and 4,302,565 have a relatively narrow molecular weight distribution, Mw/Mn, value of about 2.7 to 3.8. Additionally, the catalysts of U.S.

Patents 4,302,566 and 4,302,565 require the use of a relatively high comonomer concentration in the reactor in order to produce the copolymers described therein. This results in higher production costs for the ethylene copolymers.

SUMMARY OF THE INVENTION

It has now been unexpectedly found that ethylene copolymers having a density range of about 0.91 to 0.94, a melt flow ratio of about $\geq 26$ to $\leq 40$, and a relatively low residual catalyst content can be produced at relatively high productivities for commercial purposes by a gas phase process, without experiencing some of the disadvantages of the processes of U.S. Patents 4,302,566 and 4,302,565, if the ethylene is copolymerized with one or more $C_3$ to $C_8$ alpha olefins in the presence of a high activity Mg—Ti containing complex catalyst prepared as described below.

An object of the present invention is to provide a process for producing, with relatively high productivities and in a low pressure gas phase process, ethylene copolymers which have a density of about 0.91 to 0.94, a melt flow ratio of about $\geq 26$ to $\leq 40$, and a relatively low residual catalyst content.

BRIEF DESCRIPTION OF THE DRAWINGS

FIG. I graphically shows the effect that the butene-/ethylene monomer ratio in the gas recycle gas stream under reaction equilibrium conditions has on the ethylene/butene copolymer density for different catalyst families.

FIG. II shows a gas phase fluid bed reactor system in which the catalyst system of the present invention may be employed.

DESCRIPTION OF THE PREFERRED EMBODIMENT

Figure 1:
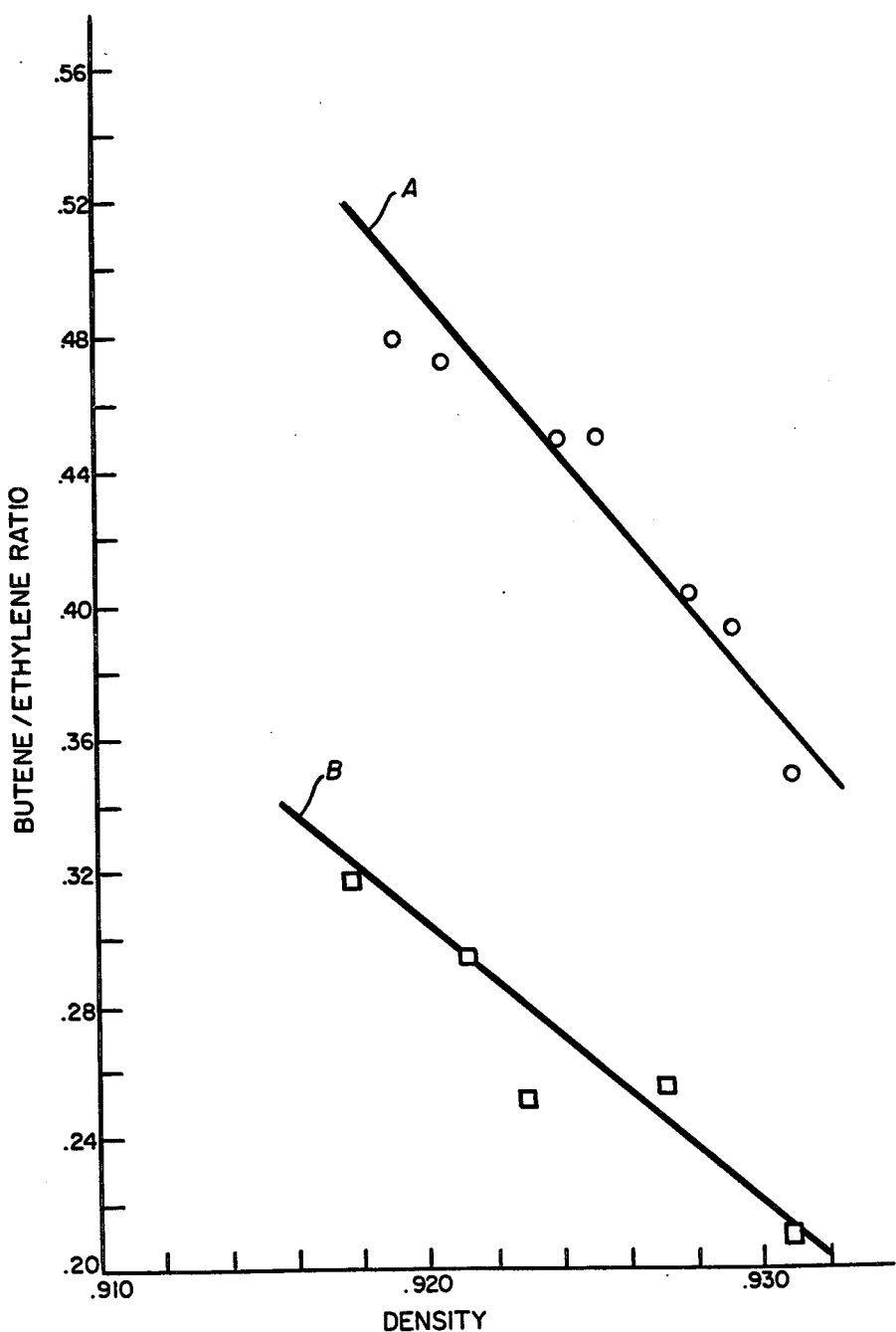

It has now been found that the desired ethylene copolymers having a melt flow ratio of about $\geq 26$ to $\leq 40$ and a density of about 0.91 to 0.94 can be readily produced with relatively high productivities in a low pressure gas phase fluid bed reaction process if the monomer charge is polymerized under a specific set of operating conditions, as detailed below, and in the presence of a specifically produced high activity catalyst, as is also detailed below. Additionally, it has been found that substantially lower comonomer concentrations are required in the reactor in order to obtain polymers of equivalent density with the catalysts of the present invention, as compared to use of the catalysts produced according to the methods described in U.S. Patents 4,302,566 and 4,302,565. Further, the copulverized catalyst compositions produced according to the present invention may be charged directly to the polymerization reactor without the need for the prior activation procedures described in U.S. Patents 4,302,566 and 4,302,565, thus eliminating a separate catalyst reduction step. Also, it has been found that the catalyst compositions of the present invention have a very high productivity in a low pressure gas phase fluid bed reactor. Further, the preparation of the copulverized catalyst compositions of the present invention is simplified as compared to the preparation of the precursor compositions as described in U.S. Patents 4,302,566 and 4,302,565.

Additionally, the ethylene copolymers produced according to the process of the present invention have in many cases a broader molecular weight distribution, Mw/Mn, and higher melt flow ratios than those produced in U.S. Patents 4,302,566 and 4,302,565, which, potentially, allows the resulting copolymers to be used in a wider range of end use applications. Also, the present copolymers have improved melt strengths as compared with the ethylene copolymers prepared with the catalysts described in U.S. Patents 4,302,566 and 4,302,565.

The Ethylene Copolymers

The copolymers which may be prepared in the process of the present invention are copolymers of a major mol percent ($\geq 90\%$) of ethylene, and a minor mol percent ($\leq 10\%$) of one or more $C_3$ to $C_8$ alpha olefins. The $C_4$ to $C_8$ alpha olefins should not contain any branching on any of their carbon atoms which is closer than the fourth carbon atom. The preferred $C_3$ to $C_8$ alpha olefins are propylene, butene-1, pentene-1, hexene-1, 4-methylpentene-1 and octene-1.

The copolymers have a melt flow ratio of about $\geq 26$ to $\leq 40$, and preferably of about $\geq 28$ to $\leq 35$. The melt flow ratio value is another means of indicating the molecular weight distribution of a polymer. The melt flow ratio (MFR) range of $\geq 26$ to $\leq 40$ thus corresponds to a Mw/Mn value range of about 3.0 to 6.0 and the MFR range of $\geq 28$ to $\leq 35$ corresponds to a Mw/Mn range of about 3.2 to 5.5.

The copolymers have a density of about 0.91 to 0.94 and preferably of about $\geq 0.917$ to $\leq 0.935$. The density of the copolymer, at a given melt index level for the copolymer, is primarily regulated by the amount of the $C_3$ to $C_8$ comonomer which is copolymerized with the ethylene. In the absence of the comonomer, the ethylene would homopolymerize with the catalyst of the present invention to provide homopolymers having a density of about $\geq 0.96$. Thus, the addition of progressively larger amounts of the comonomers to the copolymers results in a progressive lowering of the density of the copolymer. The amount of each of the various $C_3$ to $C_8$ comonomers needed to achieve the same result will vary from monomer to monomer, under the same reaction conditions.

Thus, to achieve the same results, in the copolymers, in terms of a given density, at a given melt index level, larger molar amounts of the different comonomers would be needed in the order of $C_3 > C_4 > C_5 > C_6 > C_7 > C_8$.

The melt index of a copolymer is a reflection of its molecular weight. Polymers having a relatively high molecular weight, have a relatively low melt index. Ultra-high molecular weight ethylene polymers have a high load (HLMI) melt index of about 0.0 and very high molecular weight ethylene polymers have a high load melt index (HLMI) of about 0.0 to about 1.0. Such high molecular weight polymers are difficult, if not impossible, to mold in conventional injection molding equipment. The polymers made in the process of the present invention, on the other hand, can be readily molded, in such equipment. They have a standard or normal load melt index of $\geq 0.0$ to about 100, and preferably of about 0.5 to 80, and a high load melt index (HLMI) of about 11 to about 2000. The melt index of the polymers which are made in the process of the present invention is a function of a combination of the polymerization temperature of the reaction, the density of the copolymer and the hydrogen/monomer ratio in the reaction system. Thus, the melt index is raised by increasing the polymerization temperature and/or by decreasing the density of the polymer and/or by increasing the hydrogen/monomer ratio. In addition to hydrogen, other chain transfer agents such as dialkyl zinc compounds may also be used to further increase the melt index of the copolymers.

The copolymers of the present invention have an unsaturated group content of $\leq 1$, and usually $\geq 0.1$ to $\leq 0.3$, C=C/1000 carbon atoms.

The copolymers of the present invention have a n-hexane extractables content (at 50° C.) of less than about 5, and preferably of less than about 2, weight percent.

The copolymers of the present invention have a residual catalyst content, in terms of parts per million of titanium metal, of the order of $>0$ to $\leq 2$ parts per million, (ppm) at a productivity level of $\geq 500,000$, and of the order of $>0$ to $\leq 0.5$ ppm at a productivity level of $\geq 2,000,000$. In terms of Cl, Br or I residues, the copolymers of the present invention have a Cl, Br or I residue content which depends upon the Cl, Br or I content of the precursor. From the Ti to Cl, Br or I ratio in the initial precursor, it is possible to calculate Cl, Br, or I residues from knowledge of the productivity level based on titanium residue only. Many of the copolymers of the present invention made only with Cl containing components of the catalyst system have a Cl/Ti ratio of 80 to 350. At a Cl/Ti ratio of 80 one can calculate a Cl residue content of $>0$ to $\leq 160$ ppm at a productivity of $\geq 500,000$, and a Cl residue content of $>0$ to $\leq 40$ ppm at a productivity of $\geq 2,000,000$. The copolymers are readily produced in the process of the present invention at productivities of up to about 2,500,000.

The copolymers of the present invention are granular materials which have an average particle size of the order of about 0.005 to about 0.08, and preferably of about 0.02 to about 0.04, inches in diameter. The particle size is important for the purposes of readily fluidizing the polymer particles in a fluid bed reactor, as described below. The copolymers of the present invention have a bulk density of about 15 to 26 pounds per cubic foot.

As compared to the homogeneous copolymers of U.S. Pat. No. 3,645,992, the copolymers of the present invention are heterogeneous. They have melting points of about $\geq 121°$ C.

As compared to the copolymers prepared with the catalyst systems disclosed in U.S. Patents 4,302,566 and 4,302,565, the copolymers prepared with the catalysts of the present invention have superior melt strength. The copolymers of the present invention can thus be extruded into film form at significantly higher productin rates than can the polymers of U.S. Patents 4,302,566 and 4,302,565. The copolymers of the present invention also provide better bubble stability, than do the copolymers of U.S. Patents 4,302,566 and 4,302,565 when these polymers are formed into film using the blown film process and the bubbles of film are cooled with high velocity air.

High Activity Catalyst

The high activity catalyst used in the present invention is prepared by copulverizing at least one magnesium dihalide with the complex obtained by contacting at least one titanium compound with an ester, ether, ketone or amine.

The magnesium dihalide has the structure $MgX_2$ wherein X is Cl, Br or I. Such magnesium compounds can be used individually or in combinations thereof and would include $MgCl_2$, $MgBr_2$ and $MgI_2$. Anhydrous $MgCl_2$ is the particularly preferred magnesium compound.

The titanium compound has the structure $Ti(OR)_aX_b$ wherein R is a $C_1$ to $C_{14}$ aliphatic or aromatic hydrocarbon radical, or COR' where R' is a $C_1$ to $C_{14}$ aliphatic or aromatic hydrocarbon radical, X is Cl, Br, I or mixtures thereof, a is 0 or 1, b is 2 to 4 inclusive and a+b=3 or 4.

The titanium compounds can be used individually or in combinations thereof, and would include $TiCl_3$, $TiCl_4$, $Ti(OCH_3)Cl_3$, $Ti(OC_6H_5)Cl_3$, $Ti(OCOCH_3)Cl_3$ and $Ti(OCOC_6H_5)Cl_3$.

The esters, ethers, ketones and amines include such compounds as alkyl esters of aliphatic and aromatic carboxylic acids, aliphatic ethers and cyclic ethers, and aliphatic ketones. The amines include di- and polyamino compounds such as 1,2,4-trimethylpiperazine; N,N,N',N'-tetramethyl-ethylene diamine; N,N,N',N'-tetraethyl-ethylene diamine; 2-dimethylamino-pyridine; N,N'-dimethyl-piperazine; ortho-phenylene-diamine; N,N'-dibenzyl-ethylenediamine; N,N',N''-dibenzyl-ethylenediamine; and 2,3,N,N'-dimethylnaphthylenediamine. The preferable esters and ethers are alkyl esters of $C_1$ to $C_{10}$ saturated aliphatic carboxylic acids; alkyl esters of $C_7$ to $C_{15}$ aromatic carboxylic acids; $C_2$ to $C_8$, and preferably $C_3$ to $C_4$, aliphatic ethers, $C_3$ to $C_5$ cyclic ethers, and preferably $C_4$ cyclic mono- or di-ethers. The preferred amines include N,N,N',N'-tetraethyl ethylene diamine. The most preferred compounds would include ethyl anisate and tetrahydrofuran.

About 5 to 200, and preferably 10 to 80, mols of magnesium compound are used per mol of the complex obtained by contacting the titanium compound with the ester, ether, ketone or amine (hereinafter called ED Compound).

The activator compound has the structure $Al(R'')_cX'_dH_e$ wherein $X'$ is Cl or OR''', R'' and R''' are the same or different and are $C_1$ to $C_{14}$ saturated hydrocarbon radicals, d is 0 to 1.5, e is 1 or 0 and c+d+e=3.

Such activator compounds can be used individually or in combinations thereof and would include $Al(C_2H_5)_3$, $Al(C_2H_5)_2Cl$, $Al(i-C_4H_9)_3$, $Al_2(C_2H_5)_3Cl_3$, $Al(i-C_4H_9)_2H$, $Al(C_6H_{13})_3$, $Al(C_8H_{17})_3$, $Al(C_2H_5)_2H$ and $Al(C_2H_5)_2(OC_2H_5)$.

About 10 to 400, and preferably about 50 to 150, mols of the activator compound are used per mol of the titanium compound in activating the catalyst employed in the present invention.

Additionally, materials which are solid inert diluents may be present during the copulverization of the catalyst. These diluent materials would include inorganic materials such as calcium carbonate, oxides of silicon and aluminum which are substantially deviod of hydroxyl groups, and organic materials such as aromatic hydrocarbons. The diluent material should be dry, that is free of absorbed water. This is normally done by heating or predrying the diluent materials with a dry inert gas prior to use. When using an oxide of silicon as a diluent, it may be treated with about 1 to 8 percent by weight of one or more of the aluminum alkyl compounds described above to remove the hydroxyl groups. The diluent materials are added to the catalyst in such amounts as to provide a weight ratio of the diluent to the magnesium halide in the catalyst of about 1:1 to 5:1.

Catalyst Preparation

The catalyst used in the present invention is prepared by first preparing a composition from the magnesium dihalide, titanium compound, and ED Compound, as described below, and then treating this composition with the activator compound as described below.

The composition is prepared by copulverizing the magnesium dihalide with a complex formed by contacting the titanium compound with the ED Compound.

The copulverization step which is employed in preparing the catalyst of the present invention may be conducted with the use of an ordinary ball mill or other convenient methods of copulverizing, e.g., vibrating mills. The pulverization step may be performed either batchwise or continuously. The pulverization step may be carried out at room temperature, but, if desired, it may be performed at lower or higher temperatures, for instance 0° to 100° C. The pulverization step can be performed in an atmosphere of nitrogen gas, or, if desired, another inert gas such as argon or helium may be used.

When a rotary ball mill is used for the pulverization, the following procedure is preferably followed in order to form the desired copulverized composition. A 1 to 4 liter porcelain ball mill jar which is capable of also accommodating therein 60 to 400 porcelain balls each having a diameter of ¾ inch, is charged with 20 to 600 g. of a batch of the components of the catalyst composition. These components are then ball milled in the jar for about 1 to 500 hours or more and preferably for at least 10 to 70 hours. The pulverization temperature is normally room temperature, and no heating or cooling is required.

The magnesium dihalide is generally dried before use at temperatures of 100° to 400° C. under atmospheric or reduced pressure. It is preferable to have the magnesium dihalide as anhydrous as possible. However, the inclusion of moisture is tolerable to the extent that it does not affect the utility of the catalyst.

The complex of titanium compound and ED Compound is formed by dissolving the titanium compound in a saturated aliphatic hydrocarbon such as n-hexane. The ED Compound is then dissolved in a saturated aliphatic hydrocarbon and this solution is added to dissolved titanium compound at a temperature of 0° to 50° C. Generally, 0.5 to 1.0 mols of titanium compound is used to each mol of the ester, ED Compound.

A precipitate which is the complex thus formed is then filtered, washed and dried. The magnesium dihalide and complex of titanium compound and ED Compound are then copulverized as described above.

When thus made, as disclosed above, the catalyst composition has the following empirical composition:

$Mg_mTi_1(OR)_nX_p[ED]_q$ wherein
m is $\geq 5$ to $\leq 200$
n is 0 or 1
p is $\geq 10$ to $\leq 400$
q is $>0$ to 3.0
R is a $C_1$ to $C_{14}$ aliphatic or aromatic hydrocarbon radical, or COR' wherein R' is a $C_1$ to $C_{14}$ aliphatic or aromatic hydrocarbon radical.
X is Cl, Br, or I or mixtures thereof, and
ED is a liquid electron donor compound selected from the group consisting of alkyl esters of aliphatic and aromatic carboxylic acids, aliphatic ethers, cyclic ethers, aliphatic ketones, and di- and polyamino compounds.

Activation Procedure

The copulverized Mg—Ti containing composition may be partially activated outside the polymerization reactor with activator compound in a hydrocarbon slurry. The hydrocarbon solvent is removed by drying and the partially activated copulverized composition is fed to the polymerization reactor where the activation is completed with additional activator compound. The partial activation of the Mg—Ti containing composition may also be effected during the copulverizing procedure by adding the desired amounts of the activator compound to the composition to be copulverized. Preferably, however, the copulverized composition may be completely activated in the polymerization reactor.

When the copulverized composition is partially activated outside of the polymerization reactor, it is reacted with and partially reduced by enough activator compound so as to provide a partially activated copulverized composition which has an activator compound/Ti molar ratio of about 1 to 35:1. This partial reduction reaction is preferably carried out in the ball mill or in a hydrocarbon solvent slurry followed by drying of the resulting mixture, to remove the solvent, at temperatures between 20 to 80, and preferably of 50° to 70° C.

The resulting product is a free-flowing solid particulate material which can be readily fed to the polymerization reactor.

In order to render the partially activated copulverized composition, or the unactivated copulverized composition active for ethylene polymerization purposes, activator compound must also be added to the polymerization reactor to complete, in the reactor, the activation of the copulverized composition. The activator compound and the copulverized composition are preferably fed to the reactor through separate feed lines. The activator compound may be sprayed into the reactor in the form of a solution thereof in a hydrocarbon solvent such as isopentane, hexane, or mineral oil. This solution usually contains about 2 to 30 weight percent of the activator compound. The activator compound is added to the reactor in such amounts as to provide, in the reactor, with the amounts of activator compound and titanium compound fed with the partially activated precursor composition, a total Al/Ti molar ratio of about 10 to 400 and preferably of about 50 to 150. The additional amounts of activator compound added to the reactor, react with and complete the activation of, the titanium compound in the reactor.

In a continuous gas phase process, such as the fluid bed process disclosed below, discrete portions of the partially or unactivated copulverized composition are continuously fed to the reactor, with discrete portions of any additional activator compound needed to complete the activation of the partially activated copulverized composition or to activate the unactivated copulverized composition, during the continuing polymerization process in order to replace active catalyst sites that are expended during the course of the reaction.

The Polymerization Reaction

The polymerization reaction is conducted by contacting a stream of the monomers, in a gas phase process, such as in the fluid bed process described below, and substantially in the absence of catalyst poisons such as moisture, oxygen, CO, $CO_2$, and acetylene with a catalytically effective amount of the completely activated copulverized composition at a temperature and at a pressure sufficient to initiate the polymerization reaction.

In order to achieve the desired density ranges in the copolymers it is necessary to copolymerize enough of the $\geq C_3$ comonomers with ethylene to achieve a level of $\geq 1$ to 10 mol percent of the $C_3$ to $C_8$ comonomer in the copolymer. The amount of comonomer needed to achieve this result will depend on the particular comonomer(s) employed.

There is provided below a listing of the amounts, in mols, of various comonomers that are copolymerized with ethylene in order to provide polymers having the desired density range at any given melt index. The listing also indicates the relative molar concentration, of such comonomers to ethylene, which are in the recycled gas stream of monomers under reaction equilibrium conditions in the reactor.

| Comonomer | Mol % needed in copolymer | $C_x/C_2$ mol Ratio in gas phase at equilibrium |
|---|---|---|
| propylene | 3.0 to 10 | 0.12 to 0.6 |
| butene-1 | 2.5 to 7.0 | 0.12 to 0.46 |
| pentene-1 | 2.0 to 6.0 | 0.09 to 0.3 |
| hexene-1 | 1.0 to 5.0 | 0.05 to 0.13 |
| octene-1 | 0.8 to 4.5 21. | 0.02 to 0.08 |

Figure 2:
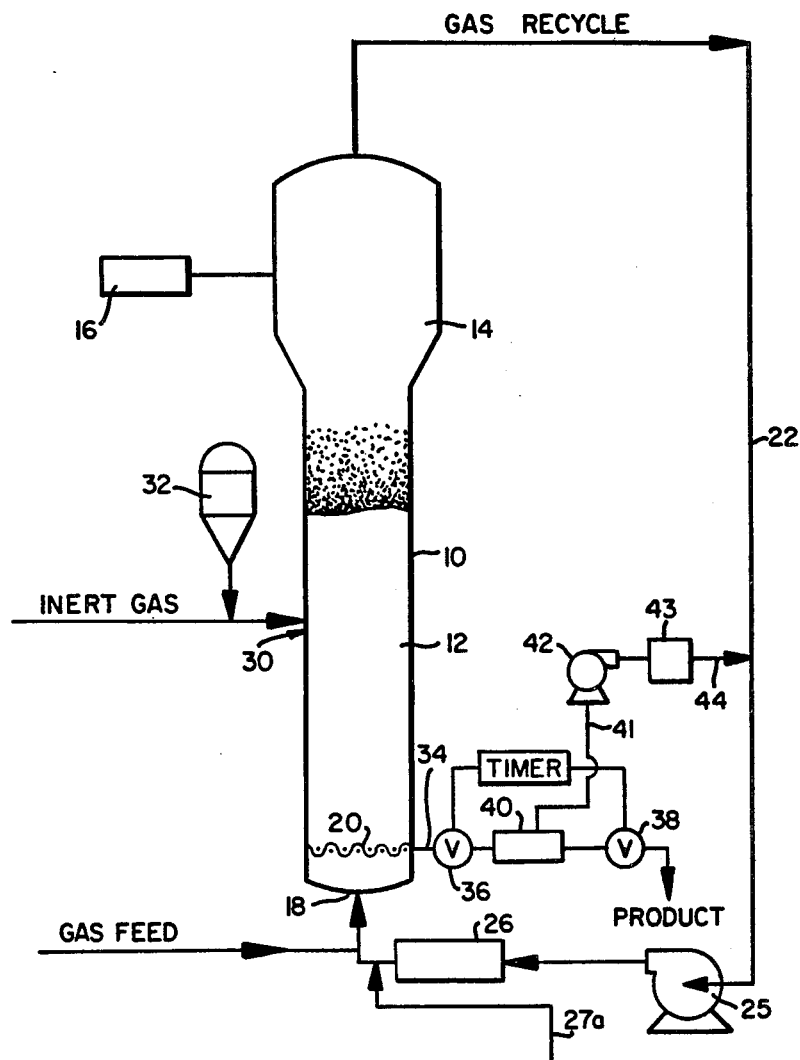

A fluidized bed reaction system which can be used in the practice of the process of the present invention is illustrated in FIG. 2. With reference thereto the reactor 10 consists of a reaction zone 12 and a velocity reduction zone 14.

The reaction zone 12 comprises a bed of growing polymer particles, formed polymer particles and a minor amount of catalyst particles fluidized by the continuous flow of polymerizable and modifying gaseous components in the form of make-up feed and recycle gas through the reaction zone. To maintain a viable fluidized bed, the mass gas flow rate through the bed must be above the minimum flow required for fluidization, and preferably from about 1.5 to about 10 times $G_{mf}$ and more preferably from about 3 to about 6 times $G_{mf}$. $G_{mf}$ is used in the accepted form as the abbreviation for the minimum gas flow required to achieve fluidization, C. Y. Wen and Y. H. Yu, "Mechanics of Fluidization", Chemical Engineering Progress Symposium Series, Vol. 62, p. 100–111 (1966).

It is essential that the bed always contain particles to prevent the formation of localized "hot spots" and to entrap and distribute the particulate catalyst throughout the reaction zone. On start up, the reaction zone is usually charged with a base of particulate polymer particles before gas flow is initiated. Such particles may be identical in nature to the polymer to be formed or different therefrom. When different, they are withdrawn with the desired formed polymer particles as the first product. Eventually, a fluidized bed of the desired polymer particles supplants the start-up bed.

The partially or unactivated copulverized catalyst composition used in the fluidized bed is preferably stored for service in a reservoir 32 under a blanket of gas which is inert to the stored material, such as nitrogen and argon.

Fluidization is achieved by a high rate of gas recycle to and through the bed, typically in the order of about 50 times the rate of feed of make-up gas. The fluidized bed has the general appearance of a dense mass of viable particles in possible free-vortex flow as created by the percolation of gas through the bed. The pressure drop through the bed is equal to or slightly greater than the mass of the bed divided by the cross-sectional area. It is thus dependent on the geometry of the reactor.

Make-up gas is fed to the bed at a rate equal to the rate at which particulate polymer product is withdrawn. The composition of the make-up gas is determined by a gas analyzer 16 positioned above the bed. The gas analyzer determines the composition of the gas being recycled and the composition of the make-up gas is adjusted accordingly to maintain an essentially steady state gaseous composition within the reaction zone.

To insure complete fluidization, the recycle gas and, where desired, part of the make-up gas are returned over gas recycle line 22 to the reactor at point 18 below the bed. There exists a gas distribution plate 20 above the point of return to aid fluidizing the bed.

The portion of the gas stream which does not react in the bed constitutes the recycle gas which is removed from the polymerization zone, preferably by passing it into a velocity reduction zone 14 above the bed where entrained particles are given an opportunity to drop back into the bed.

The recycle gas is then compressed in a compressor 25 and then passed through a heat exchanger 26 wherein it is stripped of heat of reaction before it is returned to the bed. The temperature of the bed is controlled at an essentially constant temperature under steady state conditions by constantly removing heat of reaction. No noticeable temperature gradient appears to exist within the upper portion of the bed. A temperature gradient will exist in the bottom of the bed in a layer of about 6 to 12 inches, between the temperature of the inlet gas and the temperature of the remainder of the bed. The recycle is then returned to the reactor at its base 18 and to the fluidized bed through distribution plate 20. The compressor 25 can also be placed downstream of the heat exchanger 26.

The distribution plate 20 plays an important role in the operation of the reactor. The fluidized bed contains growing and formed particulate polymer particles as well as catalyst particles. As the polymer particles are hot and possibly active, they must be prevented from settling, for if a quiescent mass is allowed to exist, any active catalyst contained therein may continue to react and cause fusion. Diffusing recycle gas through the bed at a rate sufficient to maintain fluidization throughout the bed is, therefore, important. The distribution plate 20 serves this purpose and may be a screen, slotted plate, perforated plate, a plate of the bubble cap type, and the like. The elements of the plate may all be stationary, or the plate may be of the mobile type disclosed in U.S. Pat. No. 3,298,792. Whatever its design, it must diffuse the recycle gas through the particles at the base of the bed to keep the bed in a fluidized condition, and also serve to support a quiescent bed of resin particles when the reactor is not in operation. The mobile elements of the plate may be used to dislodge any polymer particles entrapped in or on the plate.

Hydrogen may be used as a chain transfer agent in the polymerization reaction of the present invention. The ratio of hydrogen/ethylene employed will vary between about 0 to about 2.0 moles of hydrogen per mole of the monomer in the gas stream.

Any gas inert to the catalyst and reactants can also be present in the gas stream. The activator compound is preferably added to the reaction system downstream from heat exchanger 26. Thus, the activator may be fed into the gas recycle system from dispenser 27 through line 27A.

Compounds of the structure $Zn(R_a)(R_b)$, wherein $R_a$ and $R_b$ are the same or different $C_1$ to $C_{14}$ aliphatic or aromatic hydrocarbon radicals, may be used in conjunction with hydrogen, with the catalysts of the present invention, as molecular weight control or chain transfer agents, that is, to increase the melt index values of the copolymers that are produced. About 0 to 100, and preferably about 20 to 30, mols of the Zn compound (as Zn) would be used in the gas stream in the reactor per mol of titanium compound (as Ti) in the reactor. The zinc compound would be introduced into the reactor preferably in the form of a dilute solution (2 to 30 weight percent) in hydrocarbon solvent or absorbed on a solid diluent material, such as silica, of the types described above, in amounts of about 10 to 50 weight percent. These compositions tend to be pyrophoric. The zinc compound may be added alone, or with any additional portions of the activator compound that are to be added to the reactor from a feeder, not shown, which could be positioned adjacent dispenser 27.

It is essential to operate the fluid bed reactor at a temperature below the sintering temperature of the polymer particles to insure that sintering will not occur. For the production of ethylene copolymers in the process of the present invention an operating temperature of about 30° to 105° C. is preferred, and a temperature of about 75° to 95° C. is most preferred. Temperatures of about 75° to 95° C. are used to prepare products having a density of about 0.91 to 0.92, and temperatures of about 80° to 100° C. are used to prepare products having a density of about >0.92 to 0.94.

The fluid bed reactor is operated at pressures of up to about 1000 psi, and is preferably operated at a pressure of from about 150 to 350 psi, with operation at the higher pressures in such ranges favoring heat transfer since an increase in pressure increases the unit volume heat capacity of the gas.

The partially or unactivated copulverized composition is injected into the bed at a rate equal to its consumption at a point 30 which is above the distribution plate 20. Preferably, the catalyst is injected at a point in the bed where good mixing of polymer particles occurs. Injecting the catalyst at a point above the distribution plate is an important feature of this invention. Since the catalysts used in the practice of the invention are highly active, injection of the fully activated catalyst into the area below the distribution plate may cause polymerization to begin there and eventually cause plugging of the distribution plate. Injection into the viable bed, instead, aids in distributing the catalyst throughout the bed and tends to preclude the formation of localized spots of high catalyst concentration which may result in the formation of "hot spots". Injection of the catalyst into the reactor above the bed may result in excessive catalyst carryover into the recycle line where polymerization may begin and plugging of the line and heat exchanger may eventually occur.

A gas which is inert to the catalyst such as nitrogen or argon is used to carry the partially or completely reduced copulverized composition into the bed.

The production rate of the bed is controlled by the rate of catalyst injection. The production rate may be increased by simply increasing the rate of catalyst injection and decreased by reducing the rate of catalyst injection.

Since any change in the rate of catalyst injection will change the rate of generation of the heat of reaction, the temperature of the recycle gas entering the reactor is adjusted upwards or downwards to accommodate the change in rate of heat generation. This insures the maintenance of an essentially constant temperature in the bed. Complete instrumentation of both the fluidized bed and the recycle gas cooling system, is, of course, necessary to detect any temperature change in the bed so as to enable the operator to make a suitable adjustment in the temperature of the recycle gas.

Under a given set of operating conditions, the fluidized bed is maintained at essentially a constant height by withdrawing a portion of the bed as product at a rate equal to the rate of formation of the particulate polymer product. Since the rate of heat generation is directly related to product formation, a measurement of the temperature rise of the gas across the reactor (the difference between inlet gas temperature and exit gas temperature) is determinative of the rate of particulate polymer formation at a constant gas velocity.

The particulate polymer product is preferably continuously withdrawn at a point 34 at or close to the distribution plate 20 and in suspension with a portion of the gas stream which is vented as the particles settle to minimize further polymerization and sintering when the particles reach their ultimate collection zone. The suspending gas may also be used, as mentioned above, to drive the product of one reactor to another reactor.

The particulate polymer product is conveniently and preferably withdrawn through the sequential operation of a pair of timed valves 36 and 38 defining a segregation zone 40. While valve 38 is closed, valve 36 is opened to emit a plug of gas and product to the zone 40 between it and valve 36 which is then closed. Valve 38 is then opened to deliver the product to an external recovery zone. Valve 38 is then closed to await the next product recovery operation. The vented gas containing unreacted monomers may be recovered from zone 40 through line 41 and recompressed in compressor 42 and returned directly, or through a purifier 43, over line 44 to gas recycle line 22 at a point upstream of the recycle compressor 25.

Finally, the fluidized bed reactor is equipped with an adequate venting system to allow venting the bed during start up and shut down. The reactor does not require the use of stirring means and/or wall scraping means. The recycle gas line 22 and the elements therein (compressor 25, heat exchanger 26) should be smooth surfaced, and devoid of unnecessary obstructions so as not to impede the flow of recycle gas.

The highly active catalyst system of this invention appears to yield a fluid bed product having an average particle size between about 0.005 to about 0.08 inches and preferably about 0.02 to about 0.04 inches.

The feed stream of gaseous monomer, with or without inert gaseous diluents, is fed into the reactor at a space time yield of about 2 to 10 pounds/hour cubic foot of bed volume.

The term virgin resin or polymer as used herein means polymer, in granular form, as it is recovered from the polymerization reactor.

The following Examples are designed to illustrate the process of the present invention and are not intended as a limitation upon the scope thereof.

The properties of the polymers produced in the Examples were determined by the following test methods:

Density: A plaque is made and conditioned for one hour at 100° C. to approach equilibrium crystallinity. Measurement for density is then made in a density gradient column.

Melt Index (MI): ASTM D-1238—Condition E—Measured at 190° C.—reported as grams per 10 minutes.

Flow Rate (HLMI): ASTM D-1238—Condition F—Measured at 10 times the weight used in the melt index test above.

$$\text{Melt Flow Ratio } (MFR) = \frac{\text{Flow Rate}}{\text{Melt Index}}$$

Productivity: a sample of the resin product is ashed, and the weight % of ash is determined; since the ash is essentially composed of the catalyst, the productivity is thus the pounds of polymer produced per pound of total catalyst consumed. The amount of Ti, Mg and Cl in the ash are determined by elemental analysis.

Average Particle Size: This is calculated from sieve analysis data measured according to ASTM-D-1921 Method A using a 500 g sample. Calculations are based on weight fractions retained on the screens.

Bulk Density: The resin is poured via $\frac{7}{8}''$ diameter funnel into a 100 ml graduated cylinder to 100 ml line without shaking the cylinder, and weighed by difference.

Molecular Weight Distribution (Mw/Mn): High Speed Size Exclusion Chromatography: porous silica packed columns, silica 10 microns in diameter; Solvent is 1,2,4-trichloro-benzene at 140° C.; flow rate is 1 ml/minute; detection is by infra red at 2.42 micron (C-H stretch) region.

n-hexane extractables: (FDA test used for polyethylene film intended for food contact applications). A 200 square inch sample of 1.5 mil gauge film is cut into strips measuring 1"×6" and weighed to the nearest 0.1 mg. The strips are placed in a vessel and extracted with 300 ml of n-hexane at 50 ±1° C. for 2 hours. The extract is then decanted into tared culture dishes. After drying the extract in a vacuum desiccator the culture dish is weighed to the nearest 0.1 mg. The extractables, normalized with respect to the original sample weight, is then reported as the weight fraction of n-hexane extractables.

Unsaturation: Infrared Spectrophotometer (Perkin Elmer Model 21). Pressings made from the resin which are 25 mils in thickness are used as test specimens. Absorbance is measured at 10.35$\mu$ for trans-vinylidene unsaturation, 11.0$\mu$ for terminal vinyl unsaturation, and 11.25$\mu$ for pendant vinylidene unsaturation. The absorbance per mil of thickness of the pressing is directly proportional to the product of unsaturation concentration and absorbtivity. Absorbtivities are taken from the literature values of R. J. de Kock, et al, J. Polymer Science, Part B, 2, 339, (1964).

EXAMPLES

I. Preparation of Copulverized Composition

A TiCl$_4$·Ethyl Anisate complex was synthesized by adding a 5 volume percent hexane solution of ethyl anisate to a 15 volume percent hexane solution of TiCl$_4$ at a 1/1 molar ratio at 25° C. The bright orange solid complex that precipitated was washed several times with hexane and dried under a nitrogen purge at 25° C.

TiCl$_4$·THF and TiCl$_4$·2THF complexes were prepared in a similar manner using 1:1 or 1:2 molar ratios, respectively, of TiCl$_4$/THF. These complexes were yellow. (THF=tetrahydrofuran).

Anhydrous MgCl$_2$ was dried at 100°–150° C. in a vacuum oven for 12 to 72 hours.

500 grams of the MgCl$_2$ and 4 to 72 grams of the TiCl$_4$·electron donor complexes were charged to a 4-liter ball mill which can accommodate 400 porcelain balls of $\frac{3}{4}$ inch diameter. The components were pulverized in a nitrogen atmosphere for 10 to 72 hours at a temperature of 25° C. The resulting copulverized composition contained 0.02 to 0.34 mmol Ti/gm and had Mg/Ti molar ratios of 27/1 to 523/1.

II. Activation Procedure

Procedure A—In this procedure the desired weight of copulverized composition is charged directly to the polymerization reactor. The activator compound (triethyl aluminum in these examples) in an inert hydrocarbon solvent (hexane in these examples) is injected into the reaction zone.

Also, the copulverized composition may be blended with an inert carrier material such as silica or polyethylene powder prior to feeding it into the polymerization reaction. The activator compound is then injected into the reaction zone.

Procedure B—This procedure relates to a multistep activation of the copulverized composition. In this procedure the activation is conducted in such a way that the copulverized composition is only partially reduced prior to the introduction thereof into the polymerization reactor, and then the remainder of the reduction process is completed within such reactor.

The desired weight of a dry inert carrier material is charged to a mixing vessel or tank. For the examples described herein, the amount of inert carrier is about 500 grams for silica and about 1000 grams for a polyethylene carrier. The inert carrier material is then admixed with sufficient amounts of anhydrous, aliphatic hydrocarbon diluent such as isopentane to provide a slurry system. This usually requires about 4 to 7 ml of diluent per gram of inert carrier. The desired weight of the copulverized composition is then charged to the mixing vessel and thoroughly admixed with the slurry composition. The amount of copulverized composition used in this procedure for making the catalyst in these examples is about 50–300 grams, with such copulverized composition having an elemental titanium content of 0.1–0.4 millimole of Ti per gram of copulverized composition.

The desired amount of activator compound needed to partially activate the copulverized composition is added to the contents of the mixing vessel so as to partially activate the copulverized composition. The amount of activator compound used in this regard provides an Al/Ti ratio in the partially reduced copulverized composition of >0 to about ≦10. The activator compound is added to the mixing tank in the form of a solution which contains about 20 weight percent of the activator compound (triethyl aluminum in these examples) in an inert aliphatic hydrocarbon solvent (hexane in these examples). The activation is accomplished by thoroughly mixing and contacting the activator compound with the copulverized composition. All of the operations described above are conducted at room temperature, and at atmospheric pressure, in an inert atmosphere.

The resulting slurry is then dried under a purge of dry inert gas such as nitrogen or argon, at atmospheric pressure at a temperature of 60° C. to remove the hydrocarbon diluent. This process usually requires about 3 to 5 hours. The resulting product is in the form of a dry free-flowing particulate material wherein the activated copulverized composition is uniformly blended with the inert carrier. The dried non-pyrophoric product is stored under an inert gas.

Where the activator compound is to be injected into the polymerization reaction system as a dilute solution, concentrations of about 2 to 10% by weight are preferred.

Regardless of the activation method used, the activator compound is introduced into the polymerization reactor, for the purposes of completing the activation of the copulverized composition, at a rate such as to maintain the Al/Ti ratio in the polymerization reactor at a level of about 8 to 400 and preferably of about 10 to 100.

Prior to being used herein, the silicas are dried at $\geq 600°$ C. for $\geq 4$ hours.

Procedure C—In this procedure, partial activation of the catalyst is achieved by direct addition of the activator compound into the ball mill, or other mixing device, prior to or during the copulverization procedure. The resulting partially activated copulverized product can then be further used as in activation procedures A and B above.

EXAMPLE 1

Ethylene was copolymerized with butene-1 with a catalyst formed with a TiCl$_4$·Ethyl Anisate containing copulverized composition prepared as described above and activated in the polymerization reactor with triethyl aluminum as 5 weight percent solution in hexane to provide a catalyst in the reactor with an Al/Ti mol ratio of about 160.

The polymerization reaction was continuously conducted for >1 hour after equilibrium was reached and under a pressure of about 300 psig, a temperature of 85° C. and a gas velocity of about 5 to 6 times $G_{mf}$ in a fluid bed reactor system at a space time yield of about 2.6 to 4.7 lbs/hr/ft$^3$ of bed space. The reaction system was as described in FIG. 2 above. It has a lower section 10 feet high and 13½ inches in (inner) diameter, and an upper section which was 16 feet high and 23½ inches in (inner) diameter. The bed height was 5 to 8 feet. Production rate was 19 to 27 lbs/hr.

EXAMPLE 2

Ethylene was copolymerized with butene-1 with a catalyst formed with a TlCl$_4$·Ethyl Anisate containing copulverized composition prepared as described above and blended with 85.5 weight percent silica as described above and activated in the polymerization reactor with triethyl aluminum as 5 weight percent solution in hexane to provide a catalyst in the reactor with a Al/Ti mol ratio of 240.

The polymerization reaction was conducted as described in Example 1.

EXAMPLES 3 TO 7

Ethylene was copolymerized with butene-1 in this series of examples with a catalyst formed with a TiCl$_4$·Ethyl Anisate containing copulverized composition prepared as described above and activated by Activation Procedure B. The completion of the activation of the copulverized composition in the polymerization reactor was accomplished with triethyl aluminum as a 5 weight percent solution in hexane to provide the completely activated catalyst in the reactor.

The polymerization reaction was conducted as described in Example 1.

Table I below lists, with respect to Examples 1 to 7 various operating conditions employed in such examples, i.e., the type and weight percent of carrier used in the blend of carrier and copulverized composition; Al/Ti ratio in the partially activated copulverized composition; Al/Ti ratio maintained in the reactor; polymerization temperature; H$_2$/ethylene mol ratio; butene-1/C$_2$ mol ratio in the reactor and catalyst productivity. Table II below lists properties of the granular virgin resins made in Examples 1 to 7, i.e., density., melt index (MI); melt flow ratio (MFR); weight % ash; Ti content (ppm), bulk density and average particle size.

TABLE I

Reaction Conditions for Examples 1 to 7

| Example | Carrier Type | Carrier wt. % | Al/Ti ratio in part. act. copulverized composition | Al/Ti ratio in reactor | Temp °C. | H$_2$/C$_2$ mol ratio | C$_4$/C$_2$ mol ratio | catalyst Productivity (MM lbs/lb. Ti) |
|---|---|---|---|---|---|---|---|---|
| 1 | — | — | — | 160 | 85 | 0.145 | 0.382 | 1.7 |
| 2 | Silica | 85.5 | — | 240 | 85 | 0.121 | 0.201 | 2.5 |
| 3 | Silica | 70.8 | 5.0 | 280 | 85 | 0.149 | 0.210 | 1.4 |
| 4 | Polyethylene powder | 67.4 | 5.1 | 240 | 85 | 0.140 | 0.183 | 1.0 |
| 5 | Silica | 69.8 | 10.2 | 90 | 90 | 0.292 | 0.303 | 1.3 |
| 6 | Silica | 81.0 | 30.6 | 180 | 85 | 0.141 | 0.197 | 2.5 |
| 7 | Silica | 69.8 | 10.2 | 175 | 80 | 0.305 | 0.206 | 1.7 |

TABLE II

Properties of Polymers made in Examples 1 to 7

| Example | Density | M.I. | MFR | ash wt. % | Ti ppm | bulk density | aver. part. size, inches |
|---|---|---|---|---|---|---|---|
| 1 | 0.9117 | 1.94 | 38.3 | 0.0175 | 0.6 | 15.0 | 0.0586 |
| 2 | 0.9319 | 0.31 | 32.0 | 0.0500 | 0.4 | 16.8 | 0.0350 |
| 3 | 0.9305 | 0.64 | 29.8 | 0.0445 | 0.7 | 19.2 | 0.0460 |
| 4 | 0.9305 | 0.57 | 30.1 | 0.0110 | 1.0 | 13.1 | 0.0662 |
| 5 | 0.9208 | 4.65 | 29.1 | 0.0420 | 0.8 | 16.2 | 0.0375 |
| 6 | 0.9318 | 0.46 | 33.0 | 0.0590 | 0.4 | 17.3 | 0.0466 |

TABLE II-continued

Properties of Polymers made in Examples 1 to 7

| Example | Density | M.I. | MFR | ash wt. % | Ti ppm | bulk density | aver. part. size, inches |
|---|---|---|---|---|---|---|---|
| 7 | 0.9199 | 0.62 | 34.9 | 0.0340 | 0.6 | 20.0 | 0.0384 |

EXAMPLE 8

Ethylene was copolymerized with butene-1 with a catalyst formed with a TiCl$_4$·2THF containing copulverized composition prepared as described above and activated in the polymerization reactor with triethyl aluminum as a 5 weight percent solution in hexane to provide the completely activated catalyst in the reactor with an Al/Ti mol ratio of 150.

The polymerization reaction was continuously conducted for >1 hour after equilibrium was reached and under a pressure of 200 psig., a temperature of 85° C. and a gas velocity of about 5 to 6 times G$_{mf}$ in a fluid bed reactor system at a space time yield of about 3.1 to 5.7 lbs/hr/ft$^3$ of bed space. The reaction system was as described in Example 1 with a bed height of 5 ft. Production rate was 14 to 26 lbs/hr.

EXAMPLES 9 AND 10

Ethylene was copolymerized with butene-1 with a catalyst formed with a TiCl$_4$·2THF containing copulverized composition prepared as described above and blended with 66.7 weight percent silica as described above and activated in the polymerization reactor with triethyl aluminum as a 5 weight percent solution in hexane to provide a catalyst in the reactor with a Al/Ti mol ratio of 150.

The polymerization reaction was conducted by the procedure as described in Example 8.

EXAMPLE 11

Ethylene was copolymerized with butene-1 with a catalyst formed with a TiCl$_4$·THF containing copulverized composition prepared as described above and blended with 75.0 weight percent silica as described above and activated in the polymerization reactor with triethyl aluminum as a 5 weight percent solution in hexane to provide a catalyst in the reactor with a Al/Ti mol ratio of 150.

The polymerization reaction was conducted by the procedure as described in Example 8.

EXAMPLE 12

Ethylene was copolymerized with butene-1 with a catalyst formed with a TiCl$_4$·THF containing copulverized composition prepared as described above except that tri(isobutyl)aluminum [TIBA] was added to the ball mill before copulverization in an amount equal to an Al/Ti mol ratio of 3/1. This resulting material was then blended with polyethylene powder to give a composition containing 66.0% polyethylene powder. This blend was then further activated in the polymerization reactor With triethyl aluminum as a 5 weight percent solution in hexane to provide the completely activated catalyst in the reactor with an Al/Ti mol ratio of 150.

The polymerization reaction was continuously conducted for >1 hour after equilibrium was reached and under a pressure of 200 psig., a temperature of 85° C. and a gas velocity of about 5 to 6 times G$_{mf}$ in a fluid bed reactor system at a space time yield of about 3.1 to 5.7 lbs/hr/ft$^3$ of bed space. The reaction system was as described in Example 1 with a bed height of 5 ft. Production rate was 14 to 26 lbs/hr.

EXAMPLE 13

Ethylene was copolymerized with butene-1 with a catalyst formed with copulverized composition prepared as described in Example 12, except that calcium carbonate was added to the ball mill in an amount equal to a CaCO$_3$/MgCl$_2$ weight ratio of 2/1. This product was then further activated in the polymerization reactor with triethyl aluminum as a 5 weight percent solution in hexane to provide the completely activated catalyst in the reactor with an Al/Ti mol ratio of 150.

The polymerization reaction was conducted by the procedure described in Example 12.

Table III below lists, with respect to Examples 8 to 13, various operating conditions employed in such examples, i.e., the type of titanium complex used in the copulverized composition; Mg/Ti ratio; Ti content; weight percent of carrier used; polymerization temperature; H$_2$/C$_2$ mol ratio; C$_4$/C$_2$ mol ratio, and catalyst productivity. Table IV below lists properties of the granular virgin resins made in Examples 8 to 13, i.e., density, melt index (MI); melt flow ratio (MFR); weight % ash., Ti content (ppm), bulk density, and average particle size.

TABLE III

Reaction Conditions for Examples 8 to 14

| | Copulverized Composition | | | | Carrier | | | | |
|---|---|---|---|---|---|---|---|---|---|
| Example | Ti compound | TIBA/Ti mol ratio | CaCO$_3$/MgCl$_2$ wt. ratio | Mg/Ti mol ratio | Ti content, mmol/gm | type | wt. % | H$_2$/C$_2$ mol ratio | C$_4$/C$_2$ mol ratio* | Catalyst Productivity (MM lbs/lb. Ti) |
| 8 | TiCl$_4$.2THF | 0 | 0 | 260 | 0.04 | none | — | 0.247 | 0.298 | 1.0 |
| 9 | TiCl$_4$.2THF | 0 | 0 | 55 | 0.17 | silica | 66.7 | 0.266 | 0.259 | 2.0 |
| 10 | TiCl$_4$.2THF | 0 | 0 | 55 | 0.17 | silica | 66.7 | 0.252 | 0.315 | 1.7 |
| 11 | TiCl$_4$.THF | 0 | 0 | 59 | 0.17 | silica | 75.0 | 0.245 | 0.251 | 2.0 |
| 12 | TiCl$_4$.THF | 3 | 0 | 214 | 0.05 | PEP | 66.0 | 0.213 | 0.310 | 0.5 |
| 13 | TiCl$_4$.THF | 3 | 3 | 50 | 0.05 | none | — | 0.225 | 0.265 | 0.5 |

TIBA = Tri(isobutyl)aluminum
PEP = Polyethylene Powder

TABLE IV

Properties of Polymers Made in Examples 8 to 14

| Example | Density | M.I. | MFR | ash wt % | Ti ppm | bulk density | aver. part. size, inches | $\overline{M_w}/\overline{M_n}$ | M.P. (°C.) (DSC) |
|---|---|---|---|---|---|---|---|---|---|
| 8 | 0.9210 | 0.89 | 31.3 | — | 1.0 | 21.5 | 0.0465 | 5.3 | 121 |

TABLE IV-continued
Properties of Polymers Made in Examples 8 to 14

| Example | Density | M.I. | MFR | ash wt % | Ti ppm | bulk density | aver. part. size, inches | $\overline{M_w}/\overline{M_n}$ | M.P. (°C.) (DSC) |
|---|---|---|---|---|---|---|---|---|---|
| 9 | 0.9255 | 1.34 | 31.1 | 0.0030 | 0.5 | 21.0 | 0.0503 | 4.5 | 123 |
| 10 | 0.9223 | 1.48 | 31.9 | — | 0.6 | 20.6 | 0.0467 | 4.8 | 122 |
| 11 | 0.9230 | 1.66 | 32.5 | — | 0.5 | 21.3 | 0.0415 | — | — |
| 12 | 0.9184 | 1.62 | 28.8 | 0.049 | 2.0 | 14.4 | 0.0538 | — | — |
| 13 | 0.9244 | 1.97 | 28.5 | 0.079 | 2.0 | 19.3 | 0.0352 | — | — |

COMPARATIVE EXAMPLES A TO C

A catalyst was prepared, and ethylene was copolymerized with butene-1 with such catalyst, according to the procedure as set forth in U.S. Patent 4,302,565, supra, as follows:

I. Preparation of Impregnated Precursor

In a 12 l flask equipped with a mechanical stirrer are placed 41.8 g (0.439 mol) anhydrous MgCl$_2$ and 2.5 l tetrahydrofuran (THF). To this mixture, 27.7 g (0.184 mol) TiCl$_4$ is added dropwise over ½ hour. It may be necessary to heat the mixture to 60° C. for about ½ hour in order to completely dissolve the material.

500 g of porous silica is added and the mixture stirred for ¼ hour. The mixture is dried with a N$_2$ purge at 60° C. for about 3-5 hours to provide a dry free flowing powder having the particle size of the silica.

II. Activation Procedure

The desired weights of impregnated precursor composition and activator compound are added to a mixing tank with sufficient amounts of anhydrous aliphatic hydrocarbon diluent such as isopentane to provide a slurry system.

The activator compound and precursor compound are used in such amounts as to provide a partially activated precursor composition which has an Al/Ti ratio of >0 to ≧10:1 and preferably of 4 to 8:1.

The contents of the slurry system are then thoroughly mixed at room temperature and at atmospheric pressure for about ¼ to ½ hour. The resulting slurry is then dried under a purge of dry inert gas such as nitrogen or argon, at atmospheric pressure and at a temperature of 65°±10° C. to remove the hydrocarbon diluent. This process usually requires about 3 to 5 hours. The resulting catalyst is in the form of a partially activated precursor composition which is impregnated within the pores of the silica. The material is a free flowing particulate material having the size and shape of the silica. It is not pyrophoric unless the aluminum alkyl content exceeds a loading of 10 weight percent. It is stored under a dry inert gas such as nitrogen or argon prior to future use. It is now ready for use by being injected into, and fully activated within, the polymerization reactor.

When additional activator compound is fed to the polymerization reactor for the purpose of completing the activation of the precursor composition, it is fed into the reactor as a dilute solution in a hydrocarbon solvent such as isopentane. These dilute solutions contain about 5 to 30% by volume of the activator compound.

The activator compound is added to the polymerization reactor so as to maintain the Al/Ti ratio in the reactor at a level of about ≧10 to 400:1 and preferably of 15 to 60:1.

III. Polymerization Reaction

Ethylene was copolymerized with butene-1 in each of these comparative examples A through C. The silica impregnated catalyst system of Examples A and B contained 14.5 weight % of precursor composition, and the silica impregnated catalyst system of Example C contained 20.0 weight % of precursor composition. The silica support used for the catalyst of Example B was treated with triethyl aluminum, as described above, before it was used to make the supported catalyst system. In each of the Examples the precursor composition was partially activated with triethyl aluminum so as to provide the silica-precursor composition with an Al/Ti mol ratio of 5±1. The completion of the activation of the precursor composition in the polymerization reactor was accomplished with a 5% by weight solution of triethyl aluminum in isopentane so as to provide the completely activated catalyst in the reactor with an Al/Ti mol ratio of 25 to 30.

Each of the reactions was conducted for >1 hour, after equilibrium was reached, at 85° C. and under a pressure of 300 psig, a gas velocity of about 3 to 6 times G$_{mf}$ and a space time yield of about 4.4 to 6.3 in a fluid bed reactor system as previously described.

Table V below lists the butene-1ethylene molar ratio used in the Examples as well as the melt index, melt flow ratio and density of the polymers made in these examples.

COMPARATIVE EXAMPLES D TO G

A catalyst was prepared and ethylene was copolymerized with butene-1 using such catalyst, according to the procedure as set forth in U.S. Patent 4,302,566, supra, as follows:

I. Preparation of Precursor Composition

In a 5 liter flask equipped with a mechanical stirrer, 16.0 g (0.168 Mol) of anhydrous MgCl$_2$ was mixed with 850 ml of pure tetrahydrofuran under nitrogen. The mixture was stirred at room temperature (~25° C.) while 13.05 g (0.069 Mol) of TiCl$_4$ was added dropwise. After complete addition, the contents of the flask were heated to reflux for about ½ to 1 hour to dissolve the solids. The system was cooled to room temperature and 3 liters of pure n-hexane was slowly added over a period of ¼ hour. A yellow solid precipitated. The supernatant was decanted and the solids were washed with 3 X one liter of n-hexane. The solids were filtered and dried in a rotating evaporating flask at 40°-60° C. to give 55 g of solid precursor composition.

II. Activation Procedure

The activation is conducted in such a way that the precursor composition is only partially reduced prior to the introduction thereof into the polymerization reactor, and then the remainder of the reduction process is completed within such reactor.

The desired weight of dry inert carrier material is charged to a mixing vessel or tank. For the examples described herein the amount of inert carrier is about 500 grams for silica. The inert carrier material is then admixed with sufficient amounts of anhydrous, aliphatic hydrocarbon diluent such as isopentane to provide a slurry system. This usually requires about 4 to 7 ml of diluent per gram of inert carrier. The desired weight of the precursor composition is then charged to the mixing vessel and thoroughly admixed with the slurry composition. The amount of precursor composition used in this procedure for making the catalysts in these examples is about 80 to 135 grams, with such precursor composition having a titanium elemental content of 1±0.1 millimole of Ti per gram of precursor composition.

The desired amount of activator compound needed to partially activate the precursor composition is added to the contents of the mixing vessel so as to partially activate the precursor composition. The amount of activator compound used in this regard provides an Al/Ti ratio in the partially reduced precursor composition of >0 to <10:1 and preferably of 4 to 8:1. The activator compound is added to the mixing tank in the form of a solution which contains about 20 weight percent of the activator compound (triethyl aluminum in these examples) in an inert aliphatic hydrocarbon solvent (hexane in these examples). The activation is accomplished by thoroughly mixing and contacting the activator compound with the precursor composition. All of the operations described above are conducted at room temperature, and at atmospheric pressure in an inert atmosphere.

The resulting slurry is then dried under a purge of dry inert gas such as nitrogen or argon, at atmospheric pressure at a temperature of ≦60° C. to remove the hydrocarbon diluent. This process usually requires about 3 to 5 hours. The resulting product is in the form of a dry free-flowing particulate material wherein the activated precursor composition is uniformly blended with the inert carrier. The dried non-pyrophoric product is stored under an inert gas.

Where additional activator compound is fed to the polymerization reactor for the purposes of completing the activation of the precursor composition, it is first absorbed on a silica inert carrier material.

When the activator compound is absorbed on a silica support, the two materials are mixed in a vessel containing about 4 ml of isopentane per gram of carrier material. The resulting slurry is then dried for about 3 to 5 hours under a purge of nitrogen at atmospheric pressure at a temperature of 65°±10° C. to remove the hydrocarbon diluent.

Prior to being used herein, the silicas are dried at ≧600° C. for ≧4 hours.

III. Polymerization Reaction

Ethylene was copolymerized with butene-1 in each of these examples with catalyst formed as described above.

In each case, the partially activated precursor composition had an Al/Ti mol ratio of 4.4 to 5.8. The completion of the activation of the precursor composition in the polymerization reactor was accomplished with triethyl aluminum (as a 5 weight % solution in isopentane in Examples D, E, F and adsorbed on silica, 50/50 weight %, in Example G) so as to provide the completely activated catalyst in the reactor with an Al/Ti mol ratio of about 29 to 140. The catalyst in Example E contained 20.1 weight percent precursor and an Al/Ti ratio in the reactor of 88.3. In Example G the catalyst contained 19.8 weight percent precursor and an Al/Ti ratio in the reactor of 26.7. In Example D the catalyst contained 6.9 weight percent precursor and an Al/Ti ratio in the reactor of 42.0. In Example F the catalyst contained 8.3 weight percent precursor and an Al/Ti ratio in the reactor of 80.8.

Each of the polymerization reactions was continuously conducted for >1 hour after equilibrium was reached at 85° C. (Examples D and F) or 90° C. (Examples E and G) and under a pressure of about 300 psig and a gas velocity of about 5 to 6 times $G_{mf}$ in a fluid bed reactor system at a space time yield of about 3 to 6 lbs/hr/ft$^3$ of bed space. The reaction system was as previously described. Table V below lists the butene-1/ethylene molar ratio used in the Examples as well as the melt index, melt flow ratio and density of the polymers made in these examples. Additionally, Examples 8, 11, 9 and 3 of the present invention described, supra, are also shown in Table V for comparative purposes.

TABLE V

| Example | $C_4/C_2$ mol ratio | Density | MI | MFR |
|---|---|---|---|---|
| A | 0.472 | 0.9208 | 2.2 | 25.1 |
| B | 0.448 | 0.9238 | 1.8 | 25.3 |
| C | 0.402 | 0.9278 | 17.8 | 23.7 |
| D | 0.480 | 0.919 | 3.41 | 25.9 |
| E | 0.450 | 0.925 | 0.61 | 27.1 |
| F | 0.396 | 0.929 | 15.3 | 24.0 |
| G | 0.350 | 0.931 | 12.0 | 26.7 |
| 8 | 0.298 | 0.9210 | 0.89 | 31.3 |
| 11 | 0.251 | 0.9230 | 1.66 | 32.5 |
| 9 | 0.259 | 0.9268 | 1.33 | 30.5 |
| 3 | 0.210 | 0.9305 | 0.64 | 29.8 |

The data of Table V show that when copolymerizing ethylene with catalysts prepared by the procedures, as described in U.S. Patent 4,302,565 (Examples A to C) and U.S. Patent 4,302,566 (Examples D to G), a high comonomer concentration ($C_4/C_2$) is required to produce copolymers of a given density. When copolymerizing ethylene with catalysts prepared according to the present invention (Examples 8, 11, 9 and 3) substantially lower comonomer concentrations are required to produce copolymers with densities comparable to those of U.S. Patents 4,302,566 and 4,302,565, supra.

FIG. I graphically shows the effect of the butene-1/ethylene mole ratio on polymer density for the polymers produced by using the catalysts of Examples A through G (line A) as well as polymers produced by using the catalysts of the present invention, Examples 12, 8, 11, 9 and 3 (line B).

Additionally, the polymers of Table V were formed into film by the blown film process under comparable processing conditions. The polymers produced by the catalyst of the present invention were able to be extruded at a higher production rate than the polymers produced by the catalyst described in U.S. Patents 4,302,566 and 4,302,565. This is presumably due to the higher melt strength of the polymers of the present invention.

COMPARATIVE EXAMPLE H

Ethylene was copolymerized with butene-1 in a slurry reaction employing a catalyst formed with a TiCl$_4$·2THF containing copulverized composition prepared as described above. The copulverized composition contained 0.18 mmol of Ti/g and had a Mg/Ti molar ratio of 55:1. This composition was charged to a one liter autoclave reactor, along with 600 ml of hexane, and activated in the reactor with triethylaluminum as a 25 weight percent solution in hexane to provide a catalyst with an Al/Ti mol ratio of 40:1. The reactor was then pressurized to 90 psi with ethylene, butene-1 and hydrogen. The molar ratio of H$_2$/C$_2$ was 0.232 and the molar ratio of $C_4/C_2$ was 0.86. Polymerization was allowed to proceed for 2 hours at a temperature of 80° C. The copolymer obtained had a density of 0.926, a melt index of 1, and an MFR of 47.

By comparison with Examples 8–10, it can be seen that when ethylene is copolymerized batchwise in a slurry, a substantially higher comonomer concentration ($C_4/C_2$) is required to produce copolymers of a given density compared to polymerization in a fluid bed.

What is claimed is:

1. A continuous catalytic process for producing ethylene copolymer containing $\geq 90$ mol percent of ethylene and $\leq 10$ mol percent of one or more $C_3$ to $C_8$ $\alpha$ olefins with a Ti containing catalyst at a productivity of $\geq 500,000$ pounds of polymer per pound of Ti under a pressure of $<1000$ psi in a gas phase fluid bed reaction, said polymer being produced in granular form and having a density of about 0.91 to 0.94 and a melt flow ratio of $\geq 26$ to $\leq 40$, which comprises copolymerizing ethylene with one or more $C_3$ to $C_8$ $\alpha$ olefin monomers at a temperature of about 30° to 105° C. by contacting a monomer charge containing said $C_3$ to $C_8$ $\alpha$ olefin monomers and ethylene in a mol ratio no greater than 0.6, in a gas phase reaction zone, with particles of a catalyst system comprising an activated copulverized composition, wherein said composition has the following empirical composition $$Mg_m Ti(OR)_n X_p [ED]_q$$

wherein
m is $\geq 5$ to $\leq 200$
n is 0 or 1
p is $\geq 10$ to $\leq 400$
q is $>0$ to 3.0
R is a $C_1$ to $C_{14}$ aliphatic or aromatic hydrocarbon radical, or COR' wherein R' is a $C_1$ to $C_{14}$ aliphatic or hydrocarbon radical,
X is Cl, Br, I or mixtures thereof, and
ED is a liquid organic electron donor compound selected from the group consisting of alkyl esters of aliphatic and aromatic carboxylic acids, aliphatic ethers, cyclic ethers, aliphatic ketones and di- or polyamino compounds, said composition prepared by copulverizing magnesium dihalide with a complex obtained by contacting a titanium compound of the formula $$Ti(OR)_a X_b$$

wherein R and X are as previously defined and a is 0 or 1, b is 2 to 4 inclusive and $a+b=3$ or 4, with an electron donor compound ED, as previously defined, said copulverized composition being either partially activated with $>0$ to $\leq 10$ mols of activator compound per mol of titanium compound in said copulverized composition prior to feeding of the activated copulverized composition to said reaction zone and then being completely activated in said reaction zone with $\geq 10$ to 400 mols of activator compound per mol of titanium compound in said copulverized composition, or completely activated in said reaction zone with $\geq 10$ to 400 mols of activator compound per mol of titanium compound in said copulverized composition, said activator compound having the formula $$Al(R'')_c X''_d H_e$$

wherein
X' is Cl or OR''', R'' and R''' are the same or different and are $C_1$ to $C_{14}$ saturated hydrocarbon radicals,
d is 0 to 1.5
e is 0 or 1
$c+d+e=3$.

2. A process as in claim 1 in which the magnesium dihalide comprises $MgCl_2$.

3. A process as in claim 2 in which said electron donor comprises at least one ether.

4. A process as in claim 3 in which said electron donor compound comprises tetrahydrofuran.

5. A process as in claim 2 in which said electron donor compound comprises at least one ether.

6. A process as in claim 5 in which said electron donor compound comprises ethyl anisate.

7. A process as in claim 1 in which the complex is $TiCl_4$·ethyl anisate.

8. A process as in claim 1 in which the complex is $TiCl_4$·THF.

9. A process as in claim 1 in which the complex is $TiCl_4$·2THF.

10. A process as in claim 1 in which a solid inert diluent is added during copulverization.

11. A process as in claim 10 in which said solid inert diluent is calcium carbonate.

12. A process as in claim 1 in which a carrier material is added to the catalyst.

13. A process as in claim 12 in which said carrier material is polyethylene.

14. A process as in claim 1 wherein the $C_3$ to $C_8$ $\alpha$ olefin is butene-1, the magnesium dihalide is $MgCl_2$, and the complex is $TiCl_4$·2THF.

* * * * *